United States Patent [19]

Sprague

[11] 4,369,457
[45] Jan. 18, 1983

[54] REVERSE POLARITY DIFFERENTIAL ENCODING FOR FRINGE FIELD RESPONSIVE ELECTRO-OPTIC LINE PRINTERS

[75] Inventor: Robert A. Sprague, Saratoga, Calif.

[73] Assignee: Xerox Corporation, Stamford, Conn.

[21] Appl. No.: 187,917

[22] Filed: Sep. 17, 1980

[51] Int. Cl.³ .................. G01D 15/14; G02F 1/01
[52] U.S. Cl. ........................ 346/160; 346/108; 350/356
[58] Field of Search ............ 346/108, 160; 350/356; 358/300, 302

[56] References Cited

U.S. PATENT DOCUMENTS 4,281,904  9/1981  Sprague et al. .............. 350/356

Primary Examiner—L. T. Hix
Assistant Examiner—Thomas H. Tarcza

[57] ABSTRACT

The input data samples for a fringe field responsive electro-optic line printer are differentially encoded and the polarity of the differentially encoded data is periodically reversed, thereby reducing the number of electrodes such a printer requires to achieve a given resolution by a factor of just less than two and protecting the electro-optic element of such a printer against optical damage. The sample-to-sample voltage drops of the differentially encoded data correspond to the magnitudes of the input samples and, therefore, the fringe fields produced within the electro-optic element of the light valve for such a line printer when the encoded samples are applied to the electrodes of the light valve cause the light beam that is transmitted through the electro-optic element to be spatially modulated in accordance with the input samples. Trapped carriers are inhibited from accumulating in the electro-optic element because the nominal polarity of the fringe fields reverses in response to the changes in the polarity of the differentially encoded data.

10 Claims, 8 Drawing Figures

REVERSE POLARITY DIFFERENTIAL ENCODING FOR FRINGE FIELD RESPONSIVE ELECTRO-OPTIC LINE PRINTERS

BACKGROUND OF THE INVENTION

This invention relates to line printers and, more particularly, to reverse polarity differential encoding for fringe field responsive electro-optic line printers.

It has been shown that an electro-optic element having a plurality of individually addressable electrodes can be used as a multi-gate light valve for line printing. See, for example, a copending and commonly assigned United States Pat. No. 4,281,904 of R. A. Sprague et al., which issued Aug. 4, 1981, now U.S. Pat. No. 4,281,904 on a "TIR Electro-Optic Modulator with Individually Addressed Electrodes," and a copending an commonly assigned United States patent application of R. A. Sprague, which was filed Sept. 17, 1980 under Ser. No. 187,911 on an "Electro-Optic Line Printer". Also see "Light Gates Give Data Recorder Improved Hardcopy Resolution," *Electronic Design*, July 19, 1979, pp. 31–32; "Polarizing Filters Plot Analog Waveforms," *Machine Design*, Vol. 51, No. 17, July 26, 1979, p. 62; and "Data Recorder Eliminates Problem of Linearity," *Design News*, Feb. 4, 1980, pp. 56–57.

Almost any optically transparent electro-optical material can be used as the electro-optic element of such a light valve. As of now the most promising materials appear to be $LiNbO_3$ and $LiTaO_3$, but there are other materials which qualify for consideration, including BSN, KDP, $KD^xP$, $Ba_2NaNb_5O_{15}$ and PLZT. In any event, the electrodes of such a light valve are intimately coupled to the electro-optic element and are distributed in non-overlapping relationship widthwise of the electro-optic element (i.e., orthogonally relative to its optical axis), typically on equidistantly separated centers so that there is a generally uniform inter-electrode gap spacing.

To perform line printing with a multi-gate light valve of the foregoing type, a photosensitive recording medium, such as a xerographic photoreceptor, is exposed in an image configuration as it advances in a cross line direction (i.e., a line pitch direction) relative to the light valve. More particularly, to carry out the exposure process, a sheet-like collimated light beam is transmitted through the electro-optic element of the light valve, either along its optical axis for straight through transmission or at a slight angle relative to that axis for total internal reflection. Furthermore, successive sets of digital bits or analog signal samples (hereinafter collectively referred to as "data samples"), which represent respective collections of picture elements or pixels for successive lines of the image, are sequentially applied to the electrodes. As a result, localized electric bulk or fringe fields are created within the electro-optic element in the immediate vicinity of any electrodes to which non-reference level data samples are applied. These fields, in turn, cause localized variations in the refractive index of the electro-optic element within an interaction region (i.e., a light beam illuminated region of the electro-optic element which is subject to being penetrated by the electric fields). Thus, the phase front or polarization of the light beam is modulated (hereinafter generically referred to as p-modulation) in accordance with the data samples applied to the electrodes as the light beam passes through the interaction region. P-sensitive readout optics are used to convert the phase front or polarization modulation of the light beam into a correspondingly modulated intensity profile. For example, if the phase front of the light beam is modulated, Schlieren central dark field or central bright field imaging optics are used to image the modulated light beam onto the recording medium. Alternatively, if the input light beam is polarized, the polarization to intensity modulation conversion process may be performed by passing the polarization modulated output beam through a polarization analyizer prior to imaging it on the recording medium. "P-sensitive optics" is, of course, another coined term which is used herein to generically refer to optics for performing a phase front modulation or polarization modulation to intensity profile modulation conversion process on the light beam.

It has been found that the number of electrodes required to enable a fringe field responsive electro-optic line printer to achieve a given resolution can be reduced by a factor of just slightly less than two if the input data is differentially encoded. Each data sample of a differentially encoded data stream, other than the first, has a magnitude whose difference from the previous differentially encoded data sample corresponds to the magnitude of a respective input data sample. The first sample in the differentially encoded data stream is referenced to a common potential, such as ground. See a copending and commonly assigned United States patent application of W. D. Turner et al., which was filed Sept. 17, 1980 under Ser. No. 187,916 on "Differential Encoding for Fringe Field Responsive Electro-Optic Line Printers".

SUMMARY OF THE INVENTION

In accordance with this invention, provision is made for periodically reversing the polarity of the differentially encoded data samples an electro-optic line printer of the foregoing type, thereby protecting the electro-optic element of the light valve against optical damage. Suitably, the polarity of the differentially encoded data samples is reversed on a line-by-line basis. Reversing the polarity of the differentially encoded data samples causes the nominal polarity of the fringe fields created within the electro-optic element to reverse, thereby inhibiting trapped carriers from accumulating therein.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to a single illustrated embodiment, it is to be understood that there is no intent to limit it to that embodiment. On the contrary, the aim is to cover all modifications, alternatives and equivalents falling within the spirit and scope of the invention as defined by the appended claims.

Figure 1:
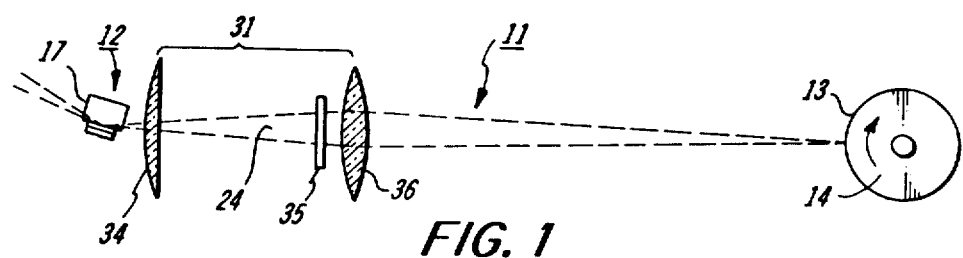
FIG. 1 is a schematic side view of a TIR electro-optic line printer which is constructed to take advantage of differential encoding.
Figure 2:
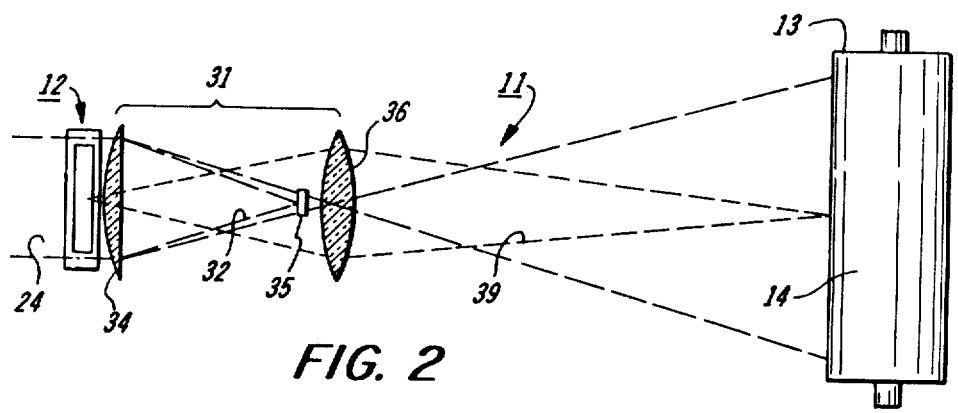
FIG. 2 is a schematic bottom plan view of the electro-optic line printer shown in FIG. 1.

Turning now to the drawings, and at this point especially to FIGS. 1 and 2, there is an electro-optic line printer 11 comprising a multi-gate light valve 12 for exposing a photosensitive recording medium 13 in an image configuration. The recording medium 13 is depicted as being a photoconductively coated xerographic drum 14 which is rotated (by means not shown) in the direction of the arrow to advance in a cross line direction relative to the light valve 12. It will, however, be evident that other xerographic and non-xerographic recording media could be used, including photoconductively coated xerographic belts and plates, as well as photsensitive film and coated paper which may be supplied as web or cut sheet stock. Hence the recording medium 13 should be visualized in the generalized case as being a photosensitive medium which is exposed in an image configuration while advancing in a cross line or line pitch direction relative to the light valve 12.

Figure 3:
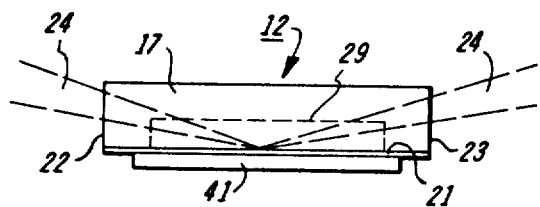
FIG. 3 is an enlarged side view of a TIR light valve for the electro-optic line printer of FIGS. 1 and 2.
Figure 4:
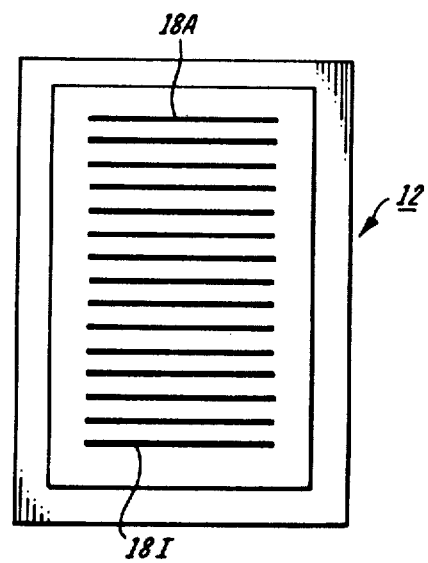
FIG. 4 is an enlarged bottom plan view of the TIR light valve of FIG. 3.

As best shown in FIGS. 3-4, the light valve 12 includes an electro-optic element 17, and a plurality of individually addressable electrodes 18a-18i. A basic advantage of this invention is that ground or reference plane electrodes are unnecessary because the data applied to the electrodes 18a-18i is differentially encoded as hereinafter described.

In this particular embodiment the light valve 12 of this particular embodiment is configured for a total internal reflection (TIR) mode of operation. Thus the electro-optic element 17 is, say, a y cut crystal of LiNbO$_3$ having a polished reflecting surface 21 which is integral with and disposed between polished input and output faces 22 and 23, respectively. The electrodes 18a-18i are, in turn, intimately coupled to the electro-optic element 17 adjacent the reflecting surface 21 and are distributed in non-overlapping relationship across essentially the full width thereof. Suitably, the electrodes 18a-18i are approximately 1-30 microns wide and are on centers which are more or less equidistantly separated to provide a generally uniform inter-electrode gap spacing of 1-30 microns. As illustrated, the electrodes 18a-18i extend generally parallel to the optical axis of the electro-optic element 17 so that the light valve 12 produces a diffraction pattern which is generally symmetrical about the zero order. It should, however, be understood that the electrodes 18a-18i could be disposed at a so-called Bragg angle relative to the optical axis of the electro-optic element 17 to provide an assymetrical diffraction characteristic for the light valve 12.

Referring to FIGS. 1-4 for a review of the operation of the line printer 11, a sheet-like collimated beam of light 24 from a suitable source, such as a laser (not shown), is transmitted through the input face 22 of the electro-optic element 17 at a grazing angle of incidence relative to the reflecting surface 21. The light beam 24 is brought to a wedge shaped focus (by means not shown) at approximately the centerline of the reflecting surface 21 and is totally internally reflected therefrom for subsequent transmission through the output face 23. As will be seen, the light beam 24 illuminates substantially the full width of the electro-optic element 17 and is phase front modulated while passing through the electro-optic element 17 in accordance with successive sets of raw input data samples which have magnitudes representing exposure values for respective picture elements for successive lines of the image.

Figure 5:
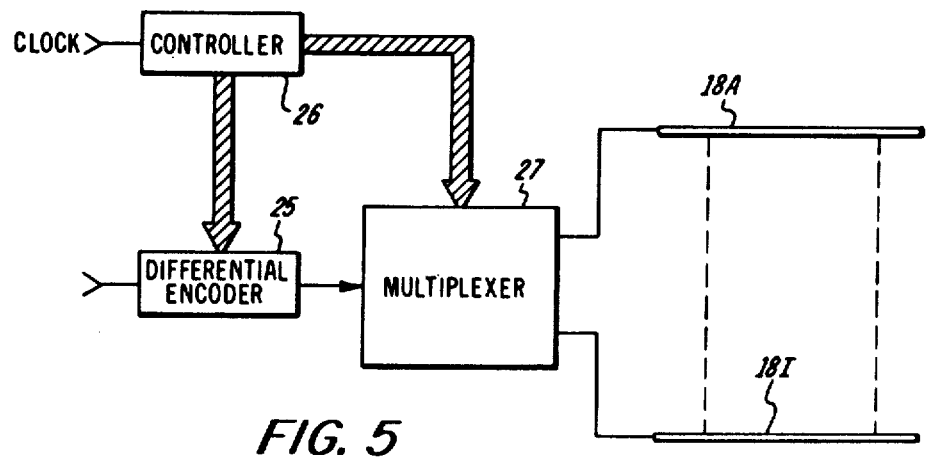
FIG. 5 is a block diagram showing a differential encoder as typically used to provide differentially encoded digital data for the TIR light valve of FIGS. 3 and 4.

As shown in FIG. 5, there is a differential encoder 25 for differentially encoding the raw input data samples on, say, a line-by-line basis in response to control signals from a controller 26. For illustrative purposes, it has been assumed that the input data samples define a serial data stream having a predetermined data rate. In that event, the differential encoder 25 serially encodes the input data at an encoding rate which is matched to the input data rate and feeds the differentially encoded data to a multiplexer 27 or the like. The multiplexer 27 responds to further control signals from the controller 26 to sequentially apply or "ripple" the differentially encoded data onto the electrodes 18a-18i at a ripple rate which is matched to the data rate. If need be, data buffers (not shown) may be used to match the input data rate to the encoding rate of the encoder 25 and to match the encoded data rate to the ripple rate of the multiplexer 27. The aim is to insure that the differentially encoded counterparts of successive input data samples are applied to immediately adjacent ones of the electrodes 18a-18i.

As will be appreciated, the input data may be processed (by means not shown) upstream of the differential encoder 25 for text editing, formatting or other purposes. See, for example, a commonly assigned United States patent application of W. F. Gunning et al., which was filed Apr. 5,1978 under Ser. No. 893,658 now U.S. Pat. No. 4,302,782. Also, it should be understood that there preferably are sample and hold circuits between the multiplexer 27 and the electrodes 18a-18i for maintaining the differentially encoded data samples for each line of the image on the electrodes 18a-18i for essentially a full line printing time (i.e., the time alloted to printing a single line of the image). See, the aforementioned Sprague application, Ser. No. 187,911.

Figure 6A:
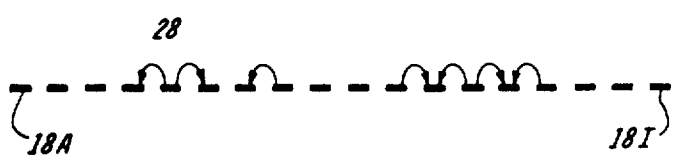
FIGS. 6a and 6b are charts illustrating reverse polarity differential encoding of a digital data stream and the opposing polarity fringe fields which are produced when such differentially encoded data is applied to the electrodes of the TIR light valve shown in FIGS. 3 and 4.
Figure 6B:
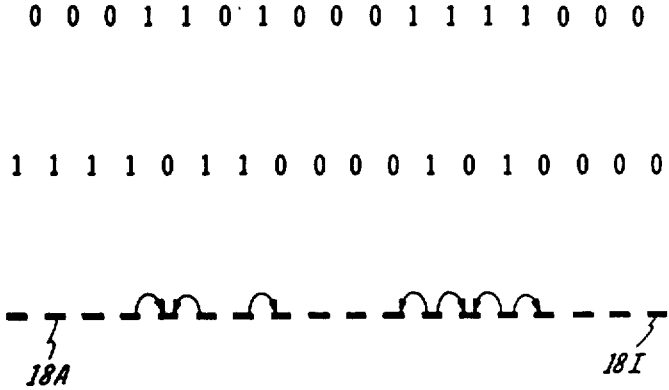

Turning to FIGS. 6a and 6b, it will be seen that differential encoding of a raw input data stream provides a differentially encoded data sample for each of the raw input data samples. Each differentially encoded data sample, other than the first sample for each line of the image, has a magnitude whose difference from the previous differentially encoded data sample corresponds to the magnitude of a respective input data sample. The first differentially encoded for each line of the image is referenced to a common reference potential, such as ground.

In accordance with this invention, the polarity of the differentially encoded data stream is periodically reversed, thereby periodically reversing the nominal polarity of the fringe fields applied to the electro-optic element 17 (FIGS. 1-3). To that end, in the illustrated embodiment, the polarity of the differentially encoded samples is reversed on a line-by-line basis. The actual polarity of the fringe fields applied to the electro-optic element 17 is, of course, data dependent. But, the nominal polarity of the fringe fields depends on whether the first differentially encoded data sample is referenced to a low or high reference level (i.e., in the digital case, to a low ("0") logic level as in FIG. 6a or to a high ("1") logic level as in FIG. 6b.). If identical input data streams are differentially encoded with opposite polarities, the fringe fields produced within the electro-optic element 17 will have opposite polarities as indicated by the arrowheads in FIGS. 6a and 6b. Reversing the nominal polarity of the fringe fields aids in preventing trapped carriers from accumulating in the electro-optic element 17 and, therefore, assists in protecting the electro-optic element 17 against optical damage.

Returning to FIGS. 3-6, when the differentially encoded data samples for any given line of an image are applied to the electrodes 18a-18i as previously described, there are electrode-to-electrode voltage drops between each adjacent pair of electrodes to which encoded samples of materially different magnitudes are applied. These voltage drops produce localized electric fringe fields 28 within an interaction region 29 of the the electro-optic element 17, thereby creating localized variations in the refractive index of the electro-optic element 17 widthwise of the interaction region 29. Inasmuch as the electrode-to-electrode voltage drops are equal to the magnitudes of successive ones of the raw input data samples relative to, say, ground, the magnitude of the refractive index variations which are produced in response to the encoded data samples for successive lines of the image faithfully represent the raw input data samples for those lines. Consequently, the phase front or polarization of the light beam 24 is sequentially spatially modulated in accordance with the data samples for successive lines of the image as the light beam 24 passes through the interaction region 29 of the electro-optic element 17.

To expose the recording medium 13 in an image configuration, there suitably are Schlieren central dark field imaging optics 31 which are optically aligned between the electro-optic element 17 and the recording medium 13 for imaging the light beam 24 onto the recording medium 13. The imaging optics 31 convert the spatial phase front modulation of the light beam 24 into a correspondingly modulated intensity profile and provide any magnification that is required to obtain an image of a desired width. To accomplish that, the imaging optics 31 suitably include a field lens 34 for focusing the zero order diffraction components 32 of the phase front modulated light beam 24 onto a central stop 35 and an imaging lens 36 for imaging the scattered higher order diffraction components onto the recording medium 13. The field lens 34 is optically aligned between the electro-optic element 17 and the stop 35 so that substantially all of the zero order components 32 of the light beam 24 are blocked by the stop 35. The higher order diffraction components of the light beam 24 scatter around the stop 35 and are collected by the imaging lens 36 which, in turn, causes them to fall onto the light valve image plane defined by the recording medium 13. Of course, other p-sensitive readout optics could be used to convert the phase front or polarization modulated light beam provided by the electro-optic element 17 into a light beam having a correspondingly modulated intensity profile.

As indicated in FIG. 2 by the broken lines 39, each adjacent pair of electrodes 18a-18i cooperates with the electro-optic element 17 and the p-sensitive readout optics 36 to effectively define a local modulator for creating a picture element at a unique, spatially predetermined position along each line of the image. Successive sets of differentially encoded data samples are applied to these local modulators while the recording medium 13 is advancing in a cross line direction relative to the light valve 12 to print successive lines of an image. Thus it will be understood that number of picture elements printed per scan line of the image is equal to the number of electrodes 18a-18i minus one.

Figure 7:
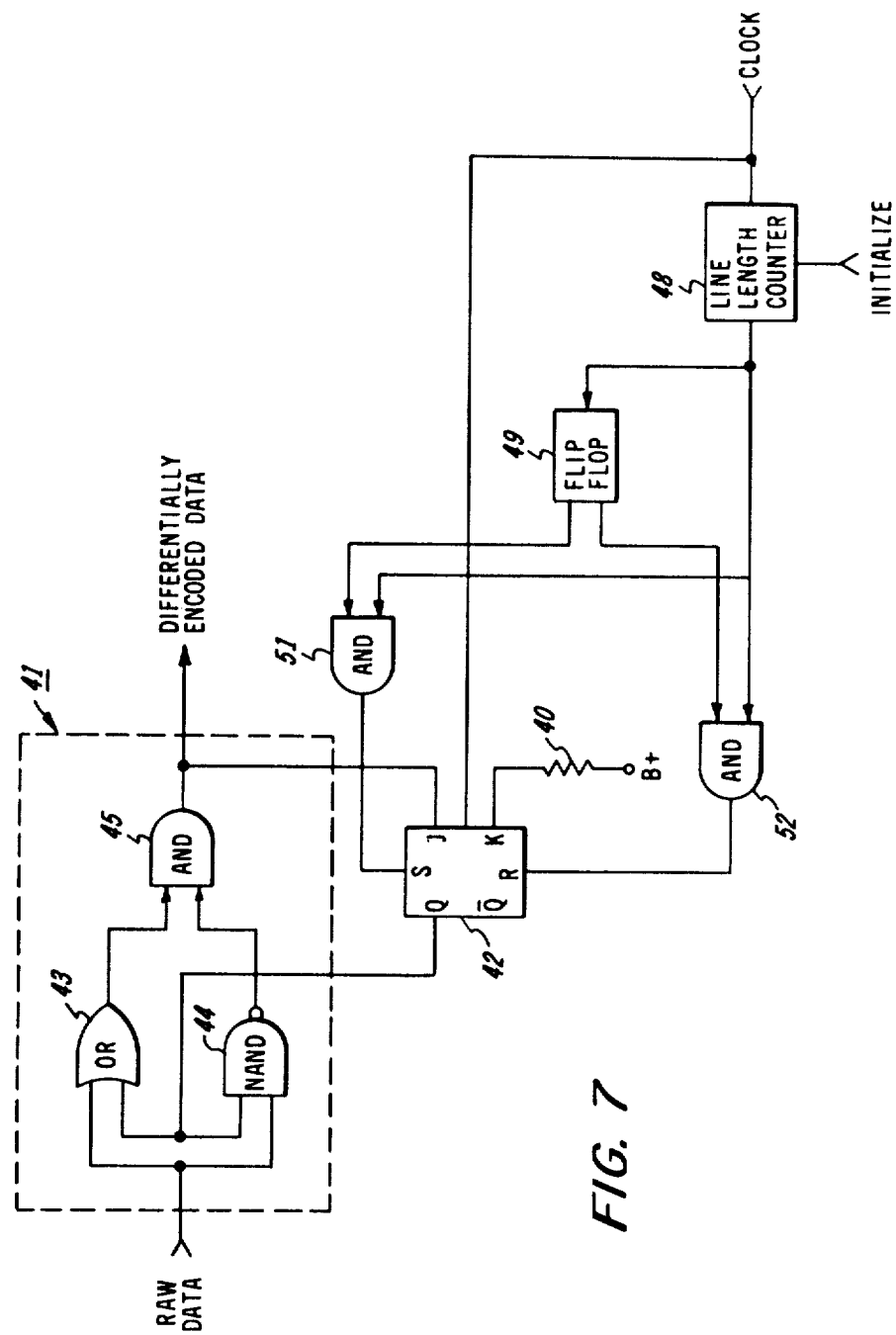
FIG. 7 is a simplified schematic diagram of a digital differential encoder which reverses the polarity of the differentially encoded data stream on a line-by-line basis.

Referring now to FIG. 7, there is an encoder 25 for differentially encoding raw digital input data samples or bits on a line-by-line basis and for periodically reversing the nominal polarity of the differentially encoded data. For illustrative purposes it has been assumed that the input bits are referenced to a low ("0") logic level reference potential. Accordingly, to perform the differential encoding, there is an exclusive OR gate 41 and a single stage shift register 42. In operation, the raw input data samples are serially applied to one input of the OR gate 41 at a predetermined data rate. The shift register 42 serially feeds back the differentially encoded data samples from the output of the OR gate 41 to the other input thereof at the same rate but with a one sample delay, so that each input data sample is exclusively ORed with the differentially encoded counterpart of the immediately preceeding data sample. To accomplish that, the shift register 42 suitably is a J-K flip-flop which has its J input coupled to the output of the OR gate 41, its K input maintained at, say, a high ("1") logic level by a pull-up resistor 43, its clock input coupled to receive clock pulses at the aforesaid data rate from a suitable source (not shown), and its Q output coupled to the second or other input of the OR gate 41. Due to the exclusive ORing of each raw data sample with the immediately preceeding differentially encoded data sample, there is a logic level transition in the differentially encoded data stream for each high ("1") logic level input data sample, but not for any of the low ("0") logic level input samples. See FIGS. 6a and 6b. Hence, the magnitude of each of the differentially encoded data samples represents the magnitude of a corresponding input data sample as referenced to the magnitude of the immediately preceeding differentially encoded data sample. In passing it should be noted that if the raw input data samples happen to be referenced to a high ("1") logic level, an exclusive NOR gate (not shown) could be used to provide a differentially encoded data stream which exhibits transitions only in response to the low ("0") logic level input samples, rather than the high ("1") logic level signals. For that reason, the term exclusive "OR-type gate" is used herein to generically cover the exclusive OR and NOR possibilities.

As illustrated, the exclusive OR gate 41 comprises an OR gate 43, a NAND gate 44, and an AND gate 45. The OR gate 43 and the NAND gate 44 each have one input coupled to receive input bits from a serial data bus 46 and another input coupled to receive differentially encoded data samples from the Q output of the flip-flop 42. The output of the OR gate 43 is coupled to one input of the AND gate 45, and the output of the NAND gate 44 is coupled to another input of the AND gate 45. A differentially encoded data stream appears at the output of the AND gate 45 because the AND gate 45 reverses states (i.e., switches from an enabled state to a disabled state or vice-versa) to provide a logic level transition in the differentially encoded data stream in response to each high ("1") logic level input data sample, but not in response to any low ("0") logic level input samples.

In keeping with this invention, provision is made in the differential encoder 25 for periodically reversing the nominal polarity of the differentially encoded data stream. For that purpose, as illustrated, there is a line length counter 48 which has its terminal count output coupled to the clock input of a flip-flop 49 which, in turn, has one output coupled to a SET input of the flip-flop 42 and another output coupled to a RESET input of the flip-flop 42 through separate AND gates 51 and 52, respectively. The counter 48 is incremented by the clock pulses at a rate selected to equal the data rate to provide a control signal for reversing the state of the flip-flop 49 immediately after the final data sample for each line of the image is encoded and before the first data sample for the next line of the image is encoded. Thus, the flip-flop 42 alternately sets and resets on a line-by-line basis so that the differential encoding of the data samples for successive lines of the image is alternately initiated with a high ("1") logic level or a low ("0") reference pulse at the Q output of the flip-flop 42. Consequently, as shown in FIGS. 6a and 6b, the encoding is performed on a line-by-line basis with opposite nominal polarities for successive lines of the image.

CONCLUSION

In view of the foregoing, it will be evident that reverse polarity differential encoding provided by this invention reduces the number of electrodes required by a multi-gate light valve of an electro-optic line printer to achieve a desired resolution and protects the electro-optic element of the light valve against optical damage.

What is claimed is:

1. In an electro-optic line printer for printing an image on a photosensitive recording medium in response to respective sets of input data samples having magnitudes representing exposure values for picture elements for successive lines of said image, the combination comprising,
   a multi-gate light valve having an optically transmissive electro-optic element and a plurality of spaced apart, individually addressable electrodes; said electrodes being disposed on one side of said electro-optic element and being intimately coupled thereto;
   means for transmitting a sheet-like, collimated light beam through an interaction region of said electro-optic element;
   encoding means for differentially encoding said input samples to provide differentially encoded data samples having sample-to-sample voltage drops corresponding to the magnitudes of respective input data samples; said respective input data samples sequentially representing adjacent picture elements for successive lines of said image;
   means coupled to said encoding means for periodically imposing opposite polarities on said encoded data samples; and
   means coupled between said encoding means and said electrodes for applying said encoded data samples to said electrodes, whereby electric fringe fields of periodically reversing polarity are created within the interaction region of said electro-optic element to sequentially spatially modulate said light beam in accordance with the input data samples for successive lines of said image and the electro-optic element is protected against optical damage.

2. The combination of claim 1 wherein the polarity of said encoded data samples is reversed on a line-by-line basis, thereby reversing the nominal polarity of said fringe fields on a line-by-line basis.

3. The combination of claim 1 wherein
   said electro-optic element has a reflecting surface,
   said light beam is totally internally reflected from said reflecting surface while passing through said interaction region, and said electrodes are disposed adjacent said reflecting surface to produce fringe fields for interacting with said light beam as said beam approaches and recedes from said reflecting surface.

4. The combination of claim 1 wherein
   said input data samples define a serial data stream having a predetermined data rate, and
   said means for imposing opposite polarities on said encoded data samples includes a line length counter which is incremented at said data rate to supply control signals for marking boundaries between the input data samples for successive lines of said image, and means for reversing the polarity of said encoded data samples in response to each of said control signals, whereby the nominal polarity of said fringe fields is reversed on a line-by-line basis to protect said electro-optic element against optical damage.

5. The combination of claim 1 wherein
   said input data samples are digital data bits, and
   said means for imposing opposite polarities on said encoded samples includes means for initiating the encoding of the bits for successive lines of said image based on a reference voltage which periodically alternates between a high and a low logic level.

6. The combination of claim 5 wherein said reference voltage alternates between said logic levels on a line-by-line basis.

7. The combination of claim 6 wherein
   said electro-optic element has a reflecting surface,
   said light beam is totally internally reflected from said reflecting surface while passing through said interaction region, and
   said electrodes are disposed adjacent said reflecting surface to produce fringe fields for interacting with said light beam as said beam approaches and recedes from said reflecting surface.

8. The combination of claim 1 wherein
   said input data samples are digital bits and are supplied as a serial data stream at a predetermined data rate; and
   said encoder includes a single stage shift register having an input and an output; an exclusive OR-type gate having one input coupled to receive said bits, another input coupled to said output of said shift register, and an output coupled to said input of said shift register; and means for applying clock pulses to said shift register at said data rate such that differentially encoded data samples are fed back from said output of said gate to said input of said gate with a one sample delay; and
   said means for periodically imposing opposite polarities on said encoded data samples includes means for alternately setting and resetting said shift register in preparation for the encoding of the input bits for different lines of said image.

9. The combination of claim 8 wherein said means for imposing opposite polarities on said encoded samples includes
- a line length counter which is incremented at said data rate to supply control signals for marking boundaries between the input data samples for successive lines of said image, and
- means for alternately setting and resetting said shift register in preparation for the encoding of the input bits for successive lines of said image.

10. The combination of claim 9 wherein
said electro-optic element has a reflecting surface,
said light beam is totally internally reflected from said reflecting surface while passing through said interaction region, and
said electrodes are disposed adjacent said reflecting surface to produce fringe fields for interacting with said light beam as said beam approaches and recedes from said reflecting surface.

* * * * *